United States Patent
Greenwell et al.

(10) Patent No.: US 8,156,075 B2
(45) Date of Patent: Apr. 10, 2012

(54) METHOD OF AUTOMATICALLY REPLICATING DATA OBJECTS BETWEEN A MOBILE DEVICE AND A SERVER

(75) Inventors: Thomas Ralph Edwards Greenwell, Herts (GB); Stephen Timothy Spence, Surrey (GB); Mark Colin Stalker, Cambridge (GB)

(73) Assignee: Critical Path Data Centre Limited, Cheshire (GB)

( * ) Notice: Subject to any disclaimer, the term of this patent is extended or adjusted under 35 U.S.C. 154(b) by 1449 days.

(21) Appl. No.: 10/539,863

(22) PCT Filed: Dec. 12, 2003

(86) PCT No.: PCT/GB03/05598
§ 371 (c)(1),
(2), (4) Date: Jun. 17, 2005

(87) PCT Pub. No.: WO2004/057828
PCT Pub. Date: Jul. 8, 2004

(65) Prior Publication Data
US 2006/0171523 A1   Aug. 3, 2006

(30) Foreign Application Priority Data
Dec. 19, 2002 (GB) .................................. 0229572.3

(51) Int. Cl.
*G06F 7/00* (2006.01)
*G06F 17/00* (2006.01)
(52) U.S. Cl. ...................................... 707/610; 709/213
(58) Field of Classification Search .................. 707/748, 707/754, 653, 621
See application file for complete search history.

(56) References Cited

U.S. PATENT DOCUMENTS

| | | | |
|---|---|---|---|
| 5,664,175 A * | 9/1997 | Jackson et al. | 1/1 |
| 6,298,386 B1 * | 10/2001 | Vahalia et al. | 709/234 |
| 6,412,017 B1 * | 6/2002 | Straube et al. | 719/313 |
| 6,442,570 B1 * | 8/2002 | Wu | 707/621 |
| 6,571,278 B1 * | 5/2003 | Negishi et al. | 709/213 |
| 6,718,348 B1 * | 4/2004 | Novak et al. | 707/621 |
| 6,779,019 B1 * | 8/2004 | Mousseau et al. | 709/206 |
| 6,865,185 B1 * | 3/2005 | Patel et al. | 370/412 |
| 7,023,843 B2 * | 4/2006 | Ruutu et al. | 370/388 |

(Continued)

FOREIGN PATENT DOCUMENTS
EP    0794646 A2 *  9/1997

(Continued)

*Primary Examiner* — Kuen S Lu
*Assistant Examiner* — Susan F Rayyan
(74) *Attorney, Agent, or Firm* — Saul Ewing LLP (57) ABSTRACT

Network operators can control how data replication services use available bandwidth, in order to make the most efficient usage of that bandwidth, using parameters applied to a data object to be replicated. The parameters may be both time dependent and also relate to how urgently that object needs to be replicated. A change log lists all objects at the device and/or server to be replicated and the parameters then comprise a weight associated with each object that defines how urgently that object needs to be replicated; the weight of each object is then locally compared to a threshold at a given time and the outcome of the comparison determines whether the object is sent for replication or not at that time. This combination of weight and threshold gives a flexible way to control the timing of data replication and hence make the best use of bandwidth.

27 Claims, 2 Drawing Sheets

U.S. PATENT DOCUMENTS

| | | | |
|---|---|---|---|
| 7,032,003 B1 * | 4/2006 | Shi et al. | 709/203 |
| 7,185,104 B1 * | 2/2007 | Thorup et al. | 709/235 |
| 7,307,954 B1 * | 12/2007 | Strandberg et al. | 370/235 |
| 7,318,075 B2 * | 1/2008 | Ashwin et al. | 1/1 |
| 2003/0227487 A1 * | 12/2003 | Hugh | 345/777 |
| 2007/0118577 A1 * | 5/2007 | East | 707/204 |
| 2008/0033635 A1 * | 2/2008 | Obradovich et al. | 701/201 |

FOREIGN PATENT DOCUMENTS

| | | |
|---|---|---|
| GB | 02 34 5824 | 7/2000 |
| WO | PCT/CA01/00486 | 4/2001 |
| WO | WO 0178319 A2 * | 10/2001 |
| WO | PCT/GB02/05308 | 11/2002 |
| WO | PCT/GB02/05311 | 11/2002 |

* cited by examiner

METHOD OF AUTOMATICALLY REPLICATING DATA OBJECTS BETWEEN A MOBILE DEVICE AND A SERVER

CROSS REFERENCE TO RELATED APPLICATIONS

This application claims the priority of PCT Application No. PCT/GB2003/005598 filed on Dec. 19, 2003 and GB Patent Application No. 0229572.3 filed on Dec. 19, 2002 the entire contents of which are hereby incorporated in total by reference.

BACKGROUND OF THE INVENTION

1. Field of the Invention

This invention relates to a method of automatically replicating data objects between a mobile device and a server; data replication is needed, for example, to back up data from the mobile device to the server and to ensure that the mobile device has the most up to date data held on the server. The mobile device and the server are connected over a wireless network, which may comprise a wide area network such as a cellular telephony network. The wireless network may also comprise a short range network, such as an 802.11 network, or a combination of short range, wide area and wire based connections.

2. Description of the Prior Art

Data replication between mobile devices (such as mobile telephones, smart phones, communicators and other kinds of wireless information device) and servers has attracted considerable attention. Reference may be made to PCT/GB2002/005308 and PCT/GB2002/005311 (to the present applicant), the contents of which are incorporated by reference.

One characteristic feature of wireless networks is the need to use bandwidth efficiently; this applies especially to wide area networks such as cellular networks, but also applies to other kinds of wireless networks, such as those based on 802.11 systems. The present invention is directed to increasing the efficiency of use of all such networks.

Cellular telephony network operators currently push data to mobile devices to update those devices with data, such as menus of the names of games that can be download to the mobile telephone. A simple example of efficient bandwidth useage is the practice of downloading these menus of games over night to make use of the available bandwidth.

To date, designers of data replication systems (as opposed to simple one-way push updating systems) have not been preoccupied with making efficient use of network bandwidth. This bias arises because the assumption behind most data replication systems is the need for immediate replication, irrespective of the impact on bandwidth.

SUMMARY OF THE PRESENT INVENTION

In a first aspect, there is a method of automatically replicating data objects between a mobile device and a server, connected together via a wireless network, in which the timing of data replication across the network is determined by a network operator applying parameters that make efficient usage of network bandwidth.

Hence, the present invention is based on the insight that the assumption that data replication must be immediate to be of value is flawed. Instead, it is useful to be able to provide network operators (such as those providing cellular services, or 802.11 services) with the ability to control how data replication services use available bandwidth in order to make the most efficient usage of that bandwidth.

The parameters applied to a given object may be both time dependent and also relate to how urgently that object needs to be replicated. For example, a change log may list all objects at the device and/or server to be replicated and the parameters then comprise a weight associated with each object that defines how urgently that object needs to be replicated. The parameters may further comprise a threshold that is a function of time, with the weight of each object being locally compared to the threshold at a given time and the outcome of the comparison determining whether the object is sent for replication or not at that time. This combination of weight and threshold gives a flexible way to control the timing of data replication and hence make the best use of bandwidth.

Further aspects and details are defined in the appended Claims.

BRIEF DESCRIPTION OF THE DRAWINGS

The present invention will be described with reference to the accompanying drawings, which show graphs of how the parameters used to control data replication can vary over time.

DETAILED DESCRIPTION

The present invention is implemented by Cognima Ltd (London, United Kingdom) to allow mobile network operators to control the timing of data replication in the Cognima Replicate™ system. The present document assumes a working familiarity of the Cognima Replicate™ system, which is described in more detail in Appendix 1

It should be noted that the term Quality of Service, or QoS, is used throughout the present document, but unless stated in context this is not related to the technical meaning of QoS in the context of RFC2475. This IETF document defines QoS very precisely in terms of a number of metrics in the IP layer, whereas the first implementation of Cognima QoS will be applied at the application layer and will not rely upon service-specific configuration of network server parameters.

1. Scheduled Replication of Data

This invention defines a way in which data transmission across a packet-switched wireless network can be intelligently scheduled, to improve efficiency of network bandwidth usage without seriously impairing the user experience.

1.1 Cognima Replicate

The Cognima Replicate system is designed to replicate user data between a mobile client and a network-based server, with zero user intervention. Both the client and the server recognise when there have been changes to the data which require replication to take place, ensuring the integrity of the distributed object database that is shared by the client and the server. This approach creates an experience for end users of the system, of always having instant access to all their data, without the any need for manual synchronisation. An implication of making replication invisible to the user is that there need be no indication, and no user control, of when the replication is taking place. The client and server devices are in control of when replication should take place, with timing decisions based on dynamic parameters that can be set by the mobile network operator.

1.2 Scheduled Replication and Network Operators

Network operators wish to smooth the peaks and troughs of the daily network usage cycle in order to make most efficient use of the bandwidth. This means moving data traffic away from peak times, and where possible moving it into troughs in the cycle. Operators will value the ability to tweak settings that affect when replication occurs, and thereby refine network efficiency.

Operators will also wish to offer services of different QoS and cost levels (usually expressed as a choice of service level bundles with their existing data tariff) to address the varying demands of customers. This is enabled by providing the network operators with the opportunity to set dynamically, the parameters which define replication QoS from the users' perspective.

Most importantly the services that Operators offer should provide a compelling user experience to their customers.

1.3 Scheduled Replication and User Expectations

The Cognima technology presents new mental models for users. Replication scheduling models, and their corresponding Service plans, must be simple and consistent to aid user acceptance. Users should be shielded from the details of replication as much as possible. Data should replicate according to users' expectation.

Users want to be able to choose one QoS level from a range of options; otherwise they feel that they are either paying too much or not getting good service. The QoS options to the user should be simple. Users will find difficulty in weighing up the relative benefits of a plan that offers Contacts in 2 minutes, Photos in 3 hours, and Banking overnight against one offering Contacts immediately, Photos overnight, and Banking in 30 minutes etc, however much these options might fit the Network Operators' demographic research.

Users will feel more comfortable choosing a general standard of service—e.g. Basic—and upgrading perhaps one particular service. Users will appreciate the opportunity to temporarily upgrade the replication lag, by service or individual object for a cost. For example, users may want a premium "Send this photo now" option, which would override the default priority with which all other photographs are replicated to the Cognima server.

1.4 Scheduled Replication and the Cognima Architecture

From an engineering point of view, solutions should be based on simple models rather than complex rule-sets. Rules that depend on time-outs (e.g. each object should have its own time limit that starts counting down when it enters the Change-Log) will severely affect performance. Likewise a solution requiring the CRE to poll the Change-Log every x seconds will also reduce performance.

2. QoS Implementation

2.1 The QoS Profile

We introduce the concept of a QoS Profile which determines when objects of a given type will be replicated for a given user.

The Network Operator can influence the timing at which all objects are replicated according to the peak and off-peak tariff or periods of high network traffic demand. It is possible for a Network Operator to define a timing profile for each application, against which each device reconciles the replication priorities and time limits of objects in the change-log to determine replication behaviour. The shape of this graph will be determined by a number of factors including the experience of the network operator in monitoring data traffic volumes.

The Network Operator can also influence whether other (lower-priority) objects in a change-log at the time of an open data connection should be replicated, once the connection-initiating object has been sent. It is possible to define an opportunism threshold to control this.

E.g. several non-urgent items are in the device's change log. The user changes a device setting that immediately initiates a data connection. The NetOp has specified that any other object in the change-log under 20 kB should be replicated using the open connection.

A different opportunism threshold should be used if the device is operating in a roamed network, as the cost to the user of initiating connections may outweigh the impact to the NetOp of sending more data at peak periods. The opportunism threshold, along with the other QoS control parameters on the client device, are communicated to the client using the replication framework and are therefore kept automatically in step between the client and the server.

In a more advanced implementation of QoS control, the network-based server will be able to determine the cell loading for a given mobile device. When the cell loading drops below a defined cell loading threshold, the server should be able to signal the client that it may start opportunistic replication. This delivers most benefit in all-IP networks where the client device has a permanently assigned IP address and can therefore be contacted instantly by the server. Otherwise the process of sending a Communications Initiation Request to the client device influences the cell loading, and adds a latency to the system that creates an opportunity for the cell loading to change before replication can start.

The Network operator can update the data traffic graph, opportunism threshold and cell loading threshold after deployment. This allows optimisation of the QoS control in the light of experience.

All objects joining the device change log are currently subject to the Pause Before Connect delay. However as a Network operator defined mechanism for defining to what extent changes are batched together, the Pause Before Connect delay will be largely superseded by QoS control.

2.2 The Service Provider Control

The Service Provider has the opportunity to determine a QoS Profile for each Cognima service. This profile contains sets of replication time limits within which Cognima objects created by that service are intended to be replicated. The actual time at which replication is attempted within the time limits is determined by a number of elements in the system including the state of the Cognima client software and the client device, and network factors such as data tariff peak/off peak times, cell loading and so on. The Service Provider can set a zero time limit—i.e. request immediate replication for objects of a given type. If replication is attempted and fails, the object remains scheduled for replication but is subject to the existing backing-off behaviour.

E.g. Provider specifies that replication of new contacts to the Server should be attempted within a 2 hour time limit. If a contact is created during a network trough or while the cell loading is very low, the device may send the contact immediately. If the timing coincides with a network peak or the cell loading is high, the device can wait for up to 2 hours for conditions to change, but after this time it must attempt replication regardless.

The QoS Profile defines the following factors as parameters determining replication timing:

Object type (e.g. Contact, Photo, DCC directory, DCC usage log etc)

How object was created (e.g. new contact on handset, edit to contact created on portal etc.)

Direction of travel (e.g. edits to contact on portal go immediately, edits to contacts on phone go within 2 hours)

Handset is on home/roamed network (e.g. photo replicates immediately at home, but within 12 hours if roaming)

And optionally . . .

Size of Object (e.g. contact is over 5 kB (i.e. contains an image)—send within 12 hours, contact is under 5 kB—send immediately)

Different behaviour when service is first activated (E.g. initial upload of photos is immediate, thereafter within 12 hours)

The time limit for replication is assigned to an object by a QoS Profile based on its time of creation. However it is also possible to change a limit already assigned according to subsequent events such as the memory available on device changing, or if the handset roams to another network. This creates a need for occasional recalculation of the weights of the items in the changelog.

The Service Provider is able to define a shelf life for objects in the QoS Profile. If an object reaches its shelf life while it is still in the change log, the object should be deleted.

E.g. The Service Provider specifies that a weather update in the DCC service has a shelf-life of 24 hours. If the item hasn't replicated to a handset within this time, it is deleted from the change-log The Service Provider can define an object as over-writeable. If a new object enters the change log that replaces an earlier version still in the change-log, the earlier version is deleted. In this situation, the Service Provider can determine whether the new object should adopt the timing of the object that has been overwritten, or should enter the system with a new replication time limit. The default setting is that new objects adopt the timing characteristics of the objects they replace.

E.g. The Service Provider specifies that a objects of the weather update class are over-writeable, and that new entries should adopt the timing of the ones that get overwritten. This will mean that an old forecast message gets overwritten by a newer one, but the newer one is not held back from replication.

Service Providers can provide different classes of service within the Profile set. One way of dong this is by defining individual QoS Profiles for each class of service.

E.g. Contacts in a Gold service are replicated immediately after creation, but under the Silver service on the same network, replication may take up to 2 hours.

A QoS tariff applies to an individual Cognima service, although it may be presented to the subscriber as a bundle of services at a particular price point.

A QoS Profile can be changed by the Service Provider once it is deployed; changes to the Profile are replicated to the relevant client devices so that the understanding of each QoS profile is common between all entities in the system.

2.3 Notes on Deriving a QoS Profile.

The parameters in a network operator (or 'netop') defined profile should aim to balance:

What is acceptable user experience for given tariff?

What scope should be given for batching changes (typically more batching while roaming)

What scope should be given for dodging network peaks

It should be expected that users will generally need changes made on a portal to be swifter than those made on the phone—we should expect users at a PC to have their phone with them, but not vice versa. Initial replication on activation should be immediate for the best initial user experience.

The cost to the user of opening several data connections when roaming is likely to outweigh the impact to the NetOp of sending more data at peak periods.

3. Algorithmic Implementation of QoS 3.1 Introduction

In the Cognima system, QoS is implemented as an increment to the functionality of both the client and the server. In particular it requires a modification to the behaviour of the change log, and introduces a requirement to recalculate certain attributes of queued change log entries. Replication can then occur as a result of the outcome of this recalculation.

3.2 Algorithm Description

The algorithm is made up of several components. We introduce a changelog item weight. This weight indicates how urgently a changelog item needs to be sent; the heavier the weight, the more urgent the item. We introduce a changelog threshold. Any items that have a weight equal to or greater than the threshold need to be sent immediately. When a connection is made all items with weight greater than the threshold minus a delta are sent. The delta represents opportunism.

For the sake of concreteness we say that weight and threshold can vary between 0-100. The weight of an item that absolutely has to be sent right now is 100; a changelog threshold of zero indicates that any entries in the changelog can be replicated right away.

Both weight and threshold can vary over the course of a day. There will be predictable variation and also dynamic variation. Some examples will clarify this.

Figure 1:
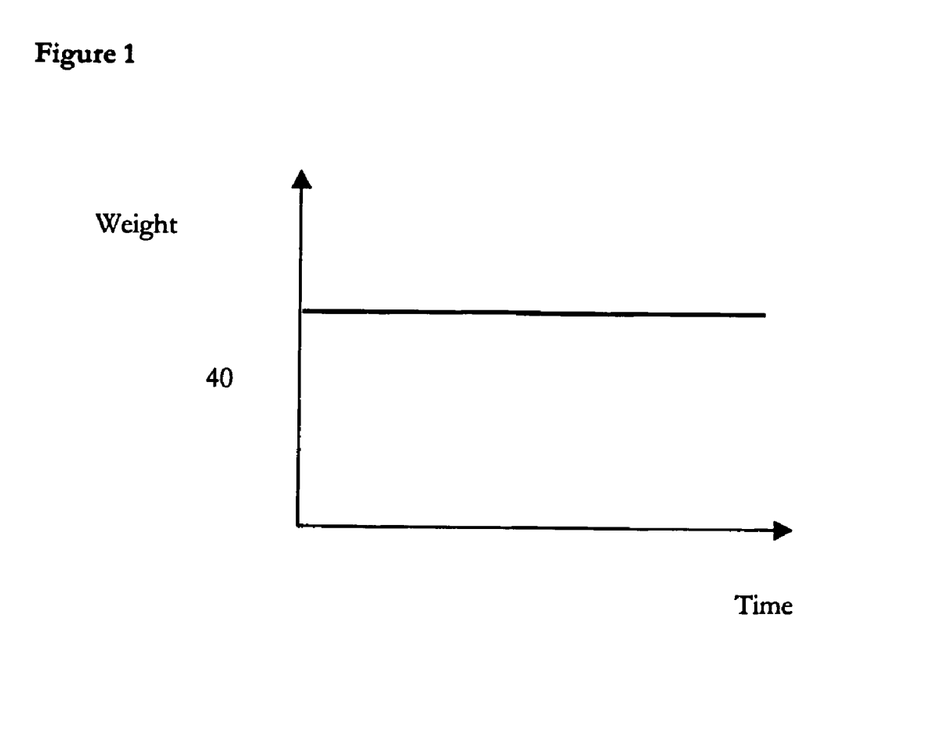
FIG. 1 illustrates a change log item weight that has a constant weight value of 40.
Figure 2:
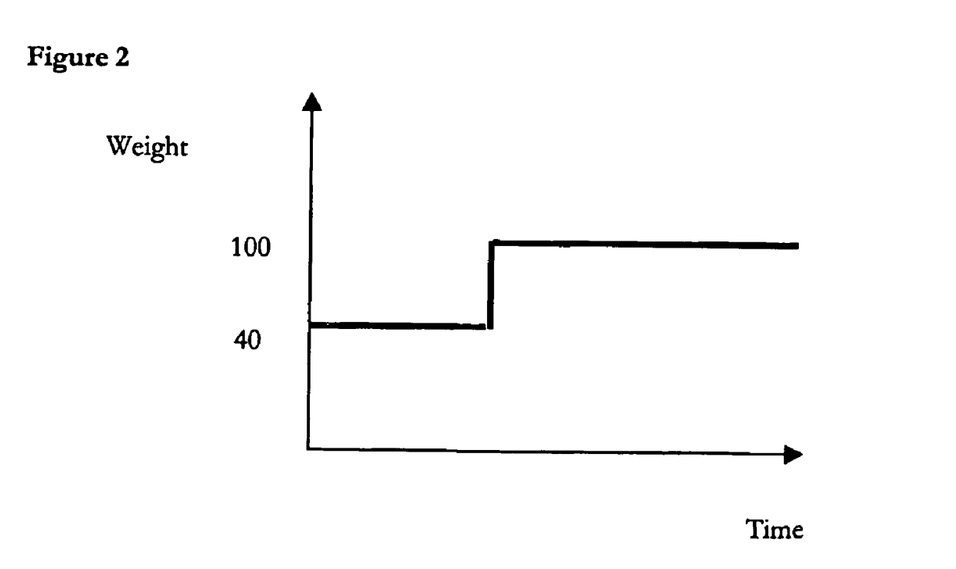
FIG. 2 illustrates a change log item weight that changes from 40 to 100 and stays at that level.

In FIG. 1, the straight line at weight value 40 shows that the weight is constant over time. The weight of an item that has to go within a certain time is shown at FIG. 2. The weight of the item starts at a relatively low value, indicating low priority, and then it jumps as we reach the time limit—the new value of 100 will force the client to attempt replication of the object at time T1.

An item that should only go at a certain time will look like the FIG. 2 diagram but the jump comes at a particular time, not after a particular duration. The weight of an item might change dynamically. Say for example that the device starts to run out of space: the weight of items could be increased to get them out of the changelog and allow ghosting (see Appendix one to the current description for an explanation of this term). The threshold will also have a graph over time, the following FIG. 3 graph shows an example of how a daily threshold cycle might appear, with a high threshold to guard against low-value traffic during peak hours (e.g. after 9.00 hours for several hours), and a lower threshold when the data networks are traditionally quieter (between 24.00 hours and 6.00 hours, the threshold is zero).

Figure 3:
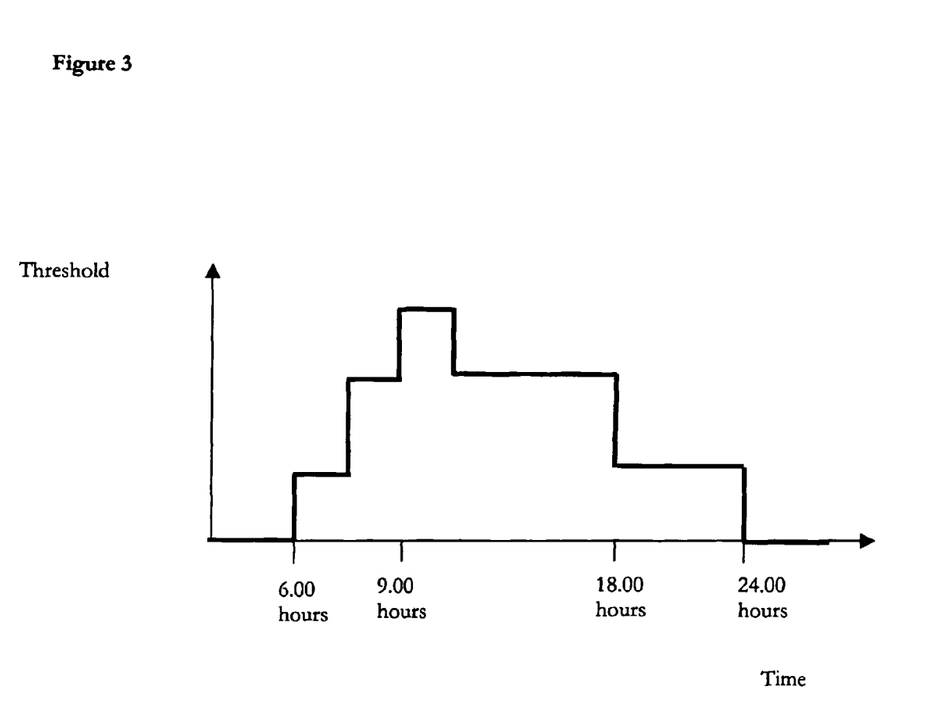
FIG. 3 illustrates how a daily threshold cycle might change with a higher threshold to guard against low-value traffic during peak hours and a lower threshold when the data networks are traditionally quieter.

The example effectively shows a daily cycle split into three tariff bands, perhaps named off-peak, standard and peak, with the replication threshold set appropriately for each band. Note that there is a fourth band just after midnight, where the threshold drops to zero—this is introduced to ensure that all changelogs are emptied once per day during the quietest period. This zero threshold period could be defined once per week or at some other interval defined by the network operator, but is recommended to ensure that the defined QoS profile does not prevent some objects from being replicated at all. As for the other bands in the profile, the off-peak period extends through the late evening and night, and represents the times at which the data network can expected to experience low traffic; replicating large objects during this time will allow the mobile network operator to make best use of the limited bandwidth available during peak times.

The zero-threshold period can be adjusted by the network operator in the light of experience; finer adjustments can be made for different user groups, per-application or even per-user thereby staggering the off-peak network usage and ensuring that the full user base for a given server does not attempt to connect to the Cognima Server at the same time.

There will be dynamic changes to the threshold, for example from cell loading or to support a marketing drive promoting a new service (during which time it may be preferable to allow basic tariff data onto the network during peak hours to encourage uptake). If it is possible for the device to detect that its cell is not busy it could drop its threshold a bit which might trigger some replication.

The core of the algorithm is to calculate the threshold graph and the weight graph of every item in the change log. If the current weight of any item is greater than the current threshold then a connection is established. Otherwise the next time that any item will exceed the threshold is deduced (ie when the graphs intersect) and a timer is set for this interval. Because both the weights and the threshold can be dynamic there are several events that can trigger a recalculation:

A new change log item is added

The server may push a new threshold value to the client. This is actually a special case of the previous event since the QoS object on the client is controlled through replication in the normal way, meaning that a new threshold value will be delivered to the client by placing the change in the device's changelog queue on the server— this changelog entry must have a weight of 100 to force immediate replication, and the resulting change of threshold may trigger or delay replication of other entries already in the queue.

A timer expires—this will usually be the timer indicating the point at which the weight of an existing entry in the changelog is due to exceed the current changelog threshold.

The cell (or network) loading changes

The memory available on the client device falls below a certain level

The device detects that its roaming state changes

A new application is deployed and activated on the device

Connection terminated—this also results in the creation/update of the 'next connection' timer.

There are two separate calculations: the weight graph of an item and the threshold graph.

Parameters that can affect the weight of an item at any given point in time are:

Direction (client->server or server->client)
Shelf life (this is usually encoded in the class)
Overwritable (this is usually encoded in the class)
Size in bytes
Time entered into change log
Priority
Time out interval
Assigned time for replication
User assignment of a non-default priority to a given object (such as the 'send now' option on an image for uploading to the user's media gallery account)
Memory available The extent to which these parameters influence the weight is controlled by the service provider (i.e. network operator) in the control as described in section "Service Provider Control" above.

Parameters that can affect the current threshold value of a change log are:

Time of day
Roaming status
Cell/network loading
Time since last replication
User tariff After each refresh of the changelog, the client software also calculates the time interval to the next intersection between a weight graph and the threshold graph; this is so that scheduled replication can take place as required even if there are no further changes before that scheduled time. Generally, the 'next event' for the change log will either be as predicted by this intersection calculation, or will be created by some external event that places a new entry in the change log (which may of course force a refresh of the values of all weights and the threshold). Note that the 'next connection' event may have a value of 'never' if the changelog is empty, unless the active QoS Profile has a zero-threshold period as in the example above.

3.3 Banding

We control both the client weight graph and the threshold graph by a structure we call banding. We assume that all graphs can be described as sets of horizontal lines which jump (concatenations of step functions). Therefore the QoS Profile for a given class can be described by an array of bands. A band is parameterised as follows:

| Parameter | Values | Description |
| --- | --- | --- |
| Band type | Delta; absolute | Whether the band is measured from creation time or against system time. |
| Direction | Server->client; client->server | Direction of travel of item. |
| Start time | Time | If delta type a duration, if absolute then a clock time. |
| End time | Time | If delta type a duration, if absolute then a clock time. |
| Weight | 0–100 | Item urgency. |

Bands can be defined as deltas from a start time or against the system clock (absolute). A weight graph for a class which should be scheduled to go within 2 hours of object creation could be described by a pair of bands: The following table could describe the QoS weight profile for the Contacts class.

| Band Name | Band Type | Direction | Start Time | End Time | Weight |
| --- | --- | --- | --- | --- | --- |
| Band1 | Delta | client->server | 00:00 | 02:00 | 25 |
| Band2 | Delta | client->server | 02:00 | 24:00 | 90 |

A threshold graph which describes the graph in the example above would be represented as follows:

| Band Name | Band Type | Direction | Start Time | End Time | Weight |
| --- | --- | --- | --- | --- | --- |
| Band1 | Absolute | client->server | 00:00 | 02:00 | 0 |
| Band2 | Absolute | client->server | 02:00 | 07:00 | 20 |
| Band3 | Absolute | client->server | 07:00 | 09:00 | 50 |
| Band4 | Absolute | client->server | 09:00 | 11:00 | 80 |
| Band5 | Absolute | client->server | 11:00 | 18:00 | 50 |
| Band6 | Absolute | client->server | 18:00 | 24:00 | 20 |
| Band7 | Absolute | server->client | 00:00 | 24:00 | 50 |

Note that there is a different weight for objects created or modified on the server and that this weight is constant throughout the daily cycle. This approach can be used to mirror the fact that server-side changes may have a different priority to those originating on the client.

The client and server carry QoS objects which encapsulate the above tables and influence the scheduling of replication. A user's device will hold a QoS object for each data class installed on the device, plus a single threshold object representing the whole system. Each QoS object holds an array of bands to describe a single weight graph. The intersection points of these graphs determine when objects of a given type will be replicated—these intersection points must be calculated by determining the weight of each object and the threshold value for the system at a given time.

3.4 Changelog Item Weight Calculation

The weight of an item in the change log has to be calculated. The QoS object for the item's class is retrieved from the data store. The banding structure is examined and a weight is looked up from the weight graph (either by calculating current time—created time in the case of delta band type, or by comparing system time in the case of absolute band type). To include object size as a parameter in weight calculation, we have added two more fields to the banding structure.

| Parameter | Values | Description |
| --- | --- | --- |
| Size limit | Size in bytes | Object size limit over which the oversize weight applies. |
| Oversize weight | 0–100 | Weight of oversize objects. |

If the object size is greater than the size limit then the oversize weight is used—note that this could be higher or lower than the default weight for the class. In some applications, the object weight can be overridden by a user request (effectively a 'send now' button) which sets the weight to 100.

3.5 Changelog Threshold Calculation

The current changelog threshold weight can be extracted from the threshold QoS object using the current system time. This value can then be modified by dynamic variables—for example if the device can detect roaming status then this can influence the threshold. Generally the threshold will be higher when roaming, to reflect the fact that replication will be more expensive; it is also possible to specify a lower limit for the threshold in a given band, effectively preventing very low priority objects from replicating at all before the device returns to its home network. In deployments where the mobile terminal can be aware of local cell loading conditions, then the cell loading can be used as a factor in adjusting the current threshold value: if the traffic loading of the local cell is below some value (e.g. 70%) then the threshold can be reduced. If the cell loading is above some value (e.g. 95%) then the threshold can be increased.

The QoS object creates timer events which represent the times of day at which the threshold is known to change, reflecting the shape of the QoS Profile as defined by the network operator. As each of these timer events fires off, the QoS threshold will be assigned a new value and the ensuing weighting recalculation will allow objects with the correct weight to be replicated.

3.6 Next Connection Time Calculation

The weight graph of an item needs to be compared to the change log threshold graph to find the next time that the item weight>=threshold weight. This calculation will ignore dynamic change to the threshold weight which is by definition unpredictable. It is a fairly simple calculation to match up the bands and compare weights at consistent times.

There are three types of event that might result in a replication session:

a change object already in the changelog may increase in weight due to moving into a new band the QoS threshold may drop due to a move from one time-based tariff to another a new entry may appear in the changelog with a weight higher than the current threshold.

For the first two events, the time at which the session starts is predictable and must be calculated at the end of each replication session. This represents the next scheduled connection time.

Appendix 1 Data Replication System Description

The present invention will be described with reference to an implementation from Cognima Limited of London, United Kingdom. Cognima has developed a data replication technology that directly addresses the need for Mobile Service Providers (MSPs) and Network Operators to increase consumer adoption of data services, encourage greater loyalty from their valuable customers, and differentiate their services from the competition.

Cognima's data replication solution addresses these issues by:

Increasing adoption by making data services compelling and effortless to use.

Establishing a high barrier to churn by securely backing up subscribers' personal data on servers controlled by those subscribers' MSP.

Enabling the MSP to create differentiated services by controlling the customer experience.

1. Overview of Uses for the Cognima Data Replication Framework

Cognima's data replication framework enables a Mobile Service Provider to build compelling services for consumer markets. The MSP hosts a Cognima Server at its data centre. The server comprises an Oracle database plus Cognima's multi-threaded Java communications server, hosted on a standards-based J2EE application server and carrier-grade Unix hardware. Section 4 and later sections describe the technical implementation in detail.

The Cognima framework replicates data entered in a mobile phone automatically (without any user intervention) to other phones via the Cognima Server. Similarly, data from external systems connected to the Cognima Server is automatically kept up-to-date on mobile phones.

Mobile subscribers using Cognima-enabled applications experience an always-available, instant connection to their personal information and friends.

Personal information can include the subscriber's address book, messages, bank account details, stock prices, pizza orders, calendar, current traffic on a route to work, or any other personalised content. The data is always kept securely backed-up on the Cognima Server and automatically replicated on all relevant client devices.

Always-available means that the personal information is accessible on whichever device or handset the subscriber is carrying, whether currently connected to the network or not since the user can always access personal information stored locally on the device). Users can also edit and manage their personal data directly on the server via a web interface—the Virtual Phone.

Instant means that subscribers do not have to wait for data to download from a server; the latest information is on their handsets even before they know they need it since that data is automatically sent to the handset (e.g. polling by the handset may occur; this can be regular periodic—such as every 30 minutes or at pre-defined times (4 pm, 5 pm etc). Pushing to the handset may also occur).

Subscribers can share their data across multiple devices and with their friends since the Cognima Server can replicate this data to any defined device or defined individual.

1.1 Example Cognima Applications

| Customer | Need | Cognima Application |
|---|---|---|
| Sarah | Sarah's phone has been stolen, including some important contact numbers and messages for which she has made no manual back-up copy. | Whenever Sarah enters data in her phone, Cognima automatically backs it up on a central server at the MSP's data centre. Sarah can buy a new mobile phone, and retrieve all her contacts and messages instantly from the central server, as long as she remains with the same MSP. She can also delete her data from the stolen phone via the MSP's portal. |
| Jill | Jill is out shopping. Before making an expensive purchase, she needs to know if her salary has been paid into her bank account. However, she is in the basement of a department store, and has no network coverage. | Cognima keeps Jill's personalised content (including her bank account details) up-to-date automatically on her mobile phone by periodically (or at a predefined time or even immediately a change occurs) sending any changed data to Jill's mobile. The latest data is there on Jill's phone even before she knows she needs it. She can access it instantly, even if there is no network coverage. |
| Matthew | Matthew likes to keep his friends informed about his current availability and 'mood'. He also likes to see what his friends are up to. He's mainly interested in keeping track of what's happening in his social group, and he wants to do this at a glance, without having to go 'on-line' or send lots of expensive messages. | Cognima shares Matthew's presence profile with his friends. When he changes his profile (e.g. selects an icon to indicate he's feeling sociable) the icon updates automatically in Matthew's address book entry on his friends' phones. Matthew can see presence information for all his friends at a glance on his own phone. He can even ask his phone to alert him when a friend is feeling sociable or bored, so that he can immediately call. |
| Laura | Laura has two mobile phones - one she uses at work, and a fashion-phone she takes out in the evenings. She wants to keep the same address book on both devices, but she hates entering data twice, and she's never figured out how to use the sync software that came with her phone. Swapping the SIM card over is cumbersome, and leaves behind data in the phone memory. | Cognima automatically keeps all the data in Laura's phones in step. Whenever she edits data on one handset, it is immediately (or periodically or at a predefined time) replicated onto the Cognima server which then updates her other phone as well. She never has to remember to press a 'sync button' - it just happens. Jill even shares some of the contacts in her phone with her husband, Geoff. When Geoff enters his mother's new mobile number, it is automatically updated in Jill's phones as well. |
| Juha | Juha also has two mobile devices - a phone and a wireless-enabled PDA. He needs to read and reply to e-mail and SMS messages on both devices, but he gets confused and frustrated, and loses productivity, when his Inbox gets out of sync. | With Cognima, SMS, e-mail and other types of messages can be read and sent from any device, and also using a 'Virtual Phone' web interface. Messages are received on all devices used by the subscriber, and sent messages appear in the Outbox on all devices. Any message read on one device is instantly marked as read on all other devices. Messages deleted from a mobile phone can be stored and retrieved via the Cognima Server. |

2. Benefits to the Mobile Subscriber

Cognima provides an ideal framework for implementing mass-market consumer data services based on the following key benefits:

Friendliness: no user intervention is required. Subscribers never need to press a 'sync' or 'download' button to access their data. System configuration and secure data transfer are completely transparent to the end user.

Instant availability: the user is always able to interact instantly with local data (even when off-line), whilst any updates take place silently in the background. For example, users can read their personalised content whilst on an underground train. The user experience is separated from the data transport.

Affordability: The MSP can control when replication takes place, and the Quality of Service (QoS) delivered. However, because the user experience is separated from the data transport, lower QoS does not affect the user's perception of the service. Crucially, this allows the MSP to offer low-cost, subscription-based services with relatively poor QoS without sacrificing user experience—e.g. data replication can happen overnight for non-urgent data services such as bank statements, yet still be satisfactory to users. Overnight data replication uses otherwise underused bandwidth and is hence far cheaper than peak time data replication. Urgent data replication (e.g. presence information) can happen at any time on a periodic or (optionally) continuous (push) basis and attract a higher charging rate. Furthermore, efficient use of phone memory & processor power allows Cognima client software to be cost-effectively installed in even the cheapest mass-market phones.

3. Benefits to the Mobile Service Provider

Cognima presents a MSP with a means to generate new data revenues, reduce churn, and to differentiate its services from those of its competitors.

3.1 Increased Usage of Existing Mobile Services

Cognima increases usage of existing mobile services:

Messaging and content-based services become much more convenient and immediate, and will therefore be used more.

The enhanced immediacy of presence information increases the use of chat and Instant Messaging, and an alert when free capability will boost voice calls.

Effortless management of multiple devices allows users to carry an appropriate phone on any occasion, and therefore make more calls and send more messages.

3.2 Compelling New Services

Cognima enables rapid introduction of compelling and affordable new mobile data services.

Cognima delivers a compelling user experience for new services in low-end phones using only spare network capacity. This is affordable and scalable for the network operator, allowing the MSP to offer understandable and predictable pricing for mass-market subscribers.

Most of the application development for new Cognima services takes place on the server side, allowing the MSP to bring new services to market quickly.

Cognima's client software can be installed as a flash memory upgrade, endowing today's mass-market handsets with smart-phone-like capabilities. New software applications can be downloaded over the air to existing Cognima-enabled handsets, allowing MSPs to roll out new data services without waiting for new devices to support them.

Third party application developers can leverage the MSP's Cognima infrastructure to develop new applications for the MSP's network.

3.3 Churn Reduction

Cognima services act as a significant barrier to churn. For example, a subscriber who stores their personal information securely at their MSP's Cognima Server can buy a new phone and immediately retrieve all personal information to their new device. All this personal information may be lost if they decide to take out a subscription with a different service provider.

3.4 Differentiation

Today, subscribers have the same basic experience of using mobile data services on all networks. For example, the experience of using WAP services is defined by the WAP protocols, the browser in the phone, and the content accessed. Many MSPs have realised that they must differentiate themselves by giving their subscribers a unique user experience, but are hindered from doing so by severe constraints to customising the services in mobile handsets.

Cognima gives MSPs the ability to implement services on the handset, and thereby to regain control of their subscribers' user experience. Most importantly, Cognima allows this without sacrificing interoperability; support for industry standards is achieved through straightforward integration with the Cognima Server. The net result is that the MSP's position in the value chain is strengthened versus the powerful brands of handset manufacturers and content providers.

4. Cognima Data Replication Framework Functional Design

4.1 Introduction

This and subsequent sections of the Detailed Description are intended to describe how the Cognima data replication system actually works. It covers the behaviour of client devices, the Cognima Server and the web client, without going into details of specific hardware, programming language, software class design or environment. It does describe the basic data structures and algorithms used.

| | Terms |
|---|---|
| Client device | A phone, PDA or other machine running the Cognima client software. |
| Cognima server | A server accessible by client devices which runs the Cognima server software to replicate data. |
| Replication | The process of copying data from a client device up to the Cognima Server and then down to other client devices belonging to the same user. |
| User | A human being who owns and uses at least one Cognima client device |
| User data | The set of information (contacts, messages, ringtones, pictures etc) that a user might want to store and manipulate on a client device. |

4.2 Purpose

The objectives of the Cognima software are:

To allow a user instant access to view and modify an 'up to date' copy of their data on multiple handheld devices capable of wireless data connectivity.

To allow a user to view and modify the same data using a conventional web browser.

To effortlessly provide secure backup of a user's data.

To give a user powerful data functionality on a cheap handset by displacing complicated and expensive processing to a server.

4.3 Highest Level Description

Client devices hold a copy of the user's data in a database on the client device. The user can access this data whether or not he has a network connection and therefore always has instant access. When a user changes the data on his device, the changes are copied to a Change-Log. The client device connects periodically to a Cognima Server on the wireless network, to send up the changes from the Change-Log and receive new data. This separates the act of changing data from the need to connect to the network (i.e. push is not continuous in a preferred implementation). The Cognima Server updates its own database with data changes received from the client device, and populates Change-Logs for any other devices the user owns. When these devices next connect, they will receive the changes and thus the devices are kept in sync, each with a copy of the same data.

The Cognima Server contains a web server which allows the user to examine directly using a web browser the copy of the data held in the Cognima Server database, and make changes to it as he would on a client device. The Cognima Server also acts as a gateway for the user to communicate with other servers on the network/internet. For example, the client device can effectively ask the Cognima Server to send a message as an SMS or an email or a fax by setting a few flags in a message object and the Cognima Server contains the functionality to communicate with email servers, SMS servers and fax machines. This can be extended to servers holding ringtones, banking details, games etc. It is easier and cheaper to build the software on the Cognima Server to talk to these other servers, than it would be to build the software on the client device.

5. Lower Level Concepts

5.1 Data Structures

5.1.1 Ids

Cognima user data is described using the terminology of object databases: classes and objects. Unfortunately, there is room for confusion with similarly named OO programming concepts and care therefore needs to be taken.

All users in a Cognima network are assigned a user id. This id is unique to the network—i.e. provided by a given network operator. All users have a Cognima address which is a combination of their user id and Cognima Server URL. This is unique in the world. Each device which belongs to a user is assigned a device id. The device id is unique to the user. This is only 8 bits so a user can have a maximum of 253 devices (id 254 is reserved for the web, id 255 is spare, id 0 is invalid). All user data is classified into classes (contacts class, messages class, bank transactions class etc) and the classes are assigned a class id which is unique in the world. Class id '12' refers to a contact, for example.

An instance of a class is an object, which is assigned an object id unique to the user, e.g. a contacts class object might be the contact for "John Smith". The object id is generated by concatenating the device id of the device which created the object with a monotonic increasing count which increases over the life of the device. So each device can create a maximum of 16777215 objects (if we encountered this limit we could reset the device id). Classes are defined by the properties which constitute them. A class is essentially an array of properties. Each property in the class has a property id which is unique to the class (and is actually just the array position of the property in the property array, starting from zero).

5.1.2 Creating Objects

An object is created on a device. It is assigned an object id and saved to the device database. A copy is also saved into a Change-Log. When the device next connects to the Cognima Server the entry in the Change-Log is sent up. The Cognima Server saves the object to its database (recording the system time), does any class specific processing that may be required (such as generating and sending an email) and adds entries to Change-Logs for any other devices that the user may own which have declared interest in the class. (The entries should be for the correct version of the class on the device).

An object may also be created on the web portal. The object id is generated (using device id of 254 as described above) and processed identically to the device. There is no Change-Log for the web portal, it gets selections directly from the Cognima Server database.

An object may also be created by a server application (e.g. a messaging module might receive an email from which it creates a message object). The object id is generated (using device id of 254 as described above) and processed identically to the device.

5.1.3 Updating Objects

One or more properties of an existing object are modified on a device. The changes are saved to the device database. Each changed property is used to generate an entry in the device Change-Log. These are sent up to the Cognima Server.

If the time of the update is later than the 'last changed' time for the property in the Cognima Server database then the Cognima Server saves the changes to its database (recording the new 'last changed' time for the property), does any required class specific processing and adds entries to Change-Logs for other devices which belong to the user, have declared the class and have a version of the class which contains the property. The update is also placed on the Change-Log for the device that originated the change. This may seem strange but is required to cope with the following scenario:

A user has 2 devices A and B. He updates property 7 on A offline at 5 pm and updates it on B offline at 6 pm. He connects to the network with A first. The value of 7 on A gets put in the Change-Log to be sent to B. Later B connects. Its value of 7 is more recent so the value of 7 on B is sent to A, but B gets A's value. Replicating the value of 7 back to B fixes this.

If an update is received by the Cognima Server for an object which is marked as deleted and the update is later than the deletion, then this is interpreted as an un-deletion. The object is undeleted, updated and then a refresh of the object in placed on the Change-Logs for all appropriate devices. Updates from the web portal or server applications work in the same way.

5.1.4 Deleting Objects

An object is deleted on the device. It is removed from the device database and an entry is put on the Change-Log listing the class id and object id. The entry is sent up to the Cognima Server.

If the time of the deletion is later than the last updated time of the object, then the Cognima Server marks the object as deleted in its database, does any class specific processing and adds the entry to other devices that belong to the user and have declared the class.

If the time of deletion is earlier than the last updated time then this indicates that the deletion is invalid and a refresh of the object is put on the Change-Log for the device which originated the deletion.

The deleted object is viewable in the web portal a manner that makes its deleted status clear. The user can select the object for un-deletion. The deletion mark is removed from the object in the Cognima Server database and entries to refresh the object are placed on the Change-Logs for all devices that belong to the user and have declared the class.

5.1.5 Property Types

Each property has a type. There are currently 9 permitted property types:

| Type name | Type value | Type description |
| --- | --- | --- |
| KcogTypeRef | 0 | 4 byte object id of another object |
| KcogTypeInt | 1 | signed 4 byte integer value |
| KcogTypeUInt | 2 | unsigned 4 byte integer value |
| KcogTypeFloat | 3 | signed 4 byte floating value |
| KcogTypeStr | 4 | a CogString (a 4 byte unsigned integer holding the number of characters in the string, followed by the character bytes) |
| KcogTypeTime | 5 | unsigned 4 byte integer value indicating the number of seconds since midnight 1st Jan 1990 |
| KcogTypeTypedStr | 6 | unsigned 4 byte integer value followed by a CogString |
| KcogTypeBlob | 7 | a stream of bytes preceded by a 4 byte unsigned integer which holds the number of bytes |
| KcogTypeArray | 8 | a blob structure which can hold an array of any kind of data |

A CogString is a character count followed by the characters. If the string is ASCII then the space taken up by the string will be (4+char count) bytes. If the string is Unicode then the space taken up will be (4+(char count*2)) bytes.

A CogTypedString is a CogString preceded by a type (4 byte unsigned integer). The only use of a typed string so far is a Contact Point. The type identifies the type of contact point (e.g. email address, home phone) and the string holds the address (e.g. bob@xxx.yyy, 01233556677).

A CogBlob is a length in bytes followed by that number of bytes. It can be used to store any binary data.

A CogArray is passed around as a 4 byte unsigned integer 'type' followed by two blobs. The 'type' indicates the type of elements held in the array. The first blob is an index blob: it holds a sequence of offsets (4 byte unsigned integers) into the second blob. The second blob is the data blob which holds the elements of the array as a sequence of binary lumps. Elements can be extracted from the data blob by counting along the index blob to get the offset of the start of the element in the data blob. This is the stream structure of the CogArray as it is passed around. Inside a particular system it may appear as a conventional vector (i.e. already parsed).

The only implemented example of a CogArray is the MessageAddress. Each element of the MessageAddress is an AddressPair. An AddressPair is a contact id (object id of a contact object) followed by a Contact Point.

5.1.6 Smart Property Parameters

Some of the properties can be made "smart". This means they can be parameterised for a specific device to sculpt the data in the property for the characteristics of the device. In practice the parameters are two 4 byte unsigned integers, one is a smart type and the other is a max size. For example, the property which holds the body text of a message might be parameterised to smart type kCogPlainText and max size 100 on a cheap phone with limited memory, but parameterised to be smart type kCogRichText and max size 1000 on a PDA with more memory.

The parameters are stored by the Cognima Server when the application is added to the device. When new objects or updates for that class are placed in the Cognima Server Change-Log for that device they are processed according to the smart parameters. This might involve, for example, truncating text, converting Unicode text to narrow text or converting image formats.

It is important for data integrity that the object held in the Cognima Server database be a copy of the object as it was generated. Even if you see a cut down version on a device you can effectively manipulate the complete version on the Cognima Server.

5.1.7 Class Versions

We have the concept of a class version which is defined by a 4 byte unsigned integer. A new class version may add properties to the end of the old class, but it may not change or remove existing properties, or insert new properties between existing properties. This should allow interoperability between versions. Class definitions with different smart property parameters are not different versions.

5.2 Passing User Data Around

Cognima utilises the idea of class metadata to minimise the data that needs to be copied around between databases. Class metadata is essentially an array of property metadata. Property metadata is a property id, a property type, a smart type and a max size.

User data is transferred as a stream with no formatting information other than a class id. This stream is parsed by looking up the class metadata. So if a stream is received for class 6 and the class metadata for class 6 says that property 0 is a KcogTypeUInt and property 1 is a KcogTypeStr, then you know that the first 4 bytes of the stream should be interpreted as an unsigned integer, the next 4 bytes should be interpreted as an unsigned integer holding the number of characters n in the succeeding string, the next n (times 2 if Unicode) bytes hold the characters in the string etc.

Client devices declare to the Cognima Server the classes that they support. This enables the device to subsequently send up only raw user data (with a header containing class id, object id and a few other things) and hence minimises bandwidth requirements. This can be contrasted with, for example, XML reliant systems that are far more bandwidth hungry.

The client device class declarations also contain the smart property parameters so that the Cognima Server can sculpt the data for the device. It is worth emphasising that the meaning of a property is hard coded into an application. The class metadata states that property 2 in class 7 is a string with max length 30 characters. It is the code in the application that interprets property 2 in class 7 as the name of a football team.

5.2.1 Data Replication Issues in More Depth

Data is held in objects that are created on client devices and the server these devices connect to (known as the Cognima Server). These objects and any changes made to them are replicated between the client devices and the Cognima Server.

The design of the replication process allows:
A set of objects to be defined that will be replicated so that the same set of objects will be held on a Cognima Server and all the client devices that are logged on to that server for a given user. New objects created on any device or the server will be replicated to all other devices. Changes in any property of an object will be replicated to all devices.
Only the minimum data to be transmitted across the network for a given update since only changes in data are sent from clients to the Cognima Server or vice versa.
A key part of the design was to not require times of modification to be kept for each property of an object on the client device as updating these on constrained client devices is slow and keeping a last modified time for each property in an object would take a lot of space.
On the Cognima Server storing modification times for all properties of an object is fine as the server has enough storage space and processing power to deal with this.

5.2.2 Metadata

In order for the system to work it needs a clear idea of what properties are defined for a given class of objects. This is done by providing the programmer with a few C++ compiler macros that allow definition of the class metadata.

The definition of the properties to be used in a class result in a Class Metadata definition. This definition tells the CRE (Cognima recognition engine) what type a given property is and allows it to pack and unpack an object or a property for transmission over a data link. In order for the CRE system to work all clients and the server must have the same class metadata definition. Thus the following occurs:
When a new Metadata definition is declared on a client device it is sent to the Cognima Server and from there the Cognima Server will send it to all other clients.
When a new Metadata definition is declared on a Cognima Server the definition is sent to all client devices.
When a new client device logs on to a Cognima Server for the first time all of the metadata definitions are sent to that device before any objects are sent.
In all of the above cases a future optimisation may be made so that the Cognima Server only sends the metadata definition to clients who access the class (and the specific properties) the metadata refers to.

5.2.3 ChangeLog

The purpose of the ChangeLog is to record any changes that have occurred since the client device last connected to the Cognima Server (or the Cognima Server to the client device). Using Cognima APIs, applications connect to the CRE and can cause objects to be created or deleted, or a property in an object to be changed. These changes are added to a Change-Log on the local device as they are made together with the time the change was made. Objects are given unique identifiers when they are created so that a given object can always be identified.

In the same way, creation and deletion of objects and changes to object properties by applications running on the Cognima Server result in the changes being added to all the Change-Logs of all the client devices registered to that user on the Cognima Server. The time of changes are recorded for each object or property.

ChangeLogs can be built in two ways:
As the new objects are created and properties are changed (this is normally the case for client devices)
Or they can be built on demand when they are needed by using the last modified times of objects and properties if these are stored on the system (in some circumstances, this method may be used on the Cognima Server instead of the above method).

5.2.4 Replication

When a client device has items in its ChangeLog to send it will connect to the Cognima Server (and likewise for the Cognima Server connecting to the client device). By default, the items in the ChangeLog are sent in the order in which they were added to the ChangeLog, however they may be re-prioritised immediately before sending to provide for premium services, urgent data and so on. Items transferred are:
A metadata definition including the type of each property of a given class of objects.
A new object that has been created—with the contents of the properties of that object.

A property has been changed—with the new value of the property.

An object has been deleted.

In all the above cases the appropriate IDs are sent to identify the object, class and properties involved. All ChangeLog items are marked with the time the item was added to the ChangeLog. These times are always local machine times and are resolved into GMT by the Time Management approach described in Section 6.2.

When a client device receives ChangeLog items from a Cognima Server:

- When a client device receives a new object message from a Cognima Server it adds this new object to its local database.
- When a client device receives an object deletion message from a Cognima Server it marks the object as deleted in its local database.
- When a client device receives a property change it is always assumed that the Cognima Server is authoritative on the current state of the database and so the change is always made to the value of the property held in the local database.

A Cognima Server receives ChangeLog items from a client device:

- When a Cognima Server receives a new object from a client device it is added to the Cognima Server database and also added to all the Change-Logs of the client devices registered to that user, apart from the Change-Log of the machine that sent the new object in the first place.
- When a Cognima Server receives an object deletion from a client device the object is marked for deletion and an object deletion message is added to all the Change-Logs of the devices registered to that user apart from the Change-Log of the machine that sent the object deletion in the first place.
- When a Cognima Server receives a property change it compares the time of the change to the current time held for that property on the Cognima Server. If the time of the property change is later than that held on the Cognima Server the property value is changed in the server database and this change is also added all the Change-Logs of the client devices registered to that user—including the one of the machine that sent in property change (in case another object update has been sent to that machine in the meantime). If the property change was not later than the one held on the Cognima Server no change is made as the stored property value is more recent—but the value is added to the list of old property values on the Cognima Server so that a user can retrieve it later if required. When times are compared the Time Management approach described in Section 6.2.below is used.
- When a device first connects to a Cognima Server it will be sent all class metadata definitions and then all the objects in the database for that user. The Deletion messages generally just mark an object for deletion. Actual removal of the object from the database may occur later on once all objects referring to that object have also been deleted.

5.2.5 Optimisations

An optimised version of the above replication protocol allows for aggregation of the entries in the ChangeLog. If a ChangeLog (in the Cognima Server or on a client device) has not yet been replicated, and a subsequent entry is added, then existing entries can be scanned to potentially reduce the number of entries that need to be replicated during the next connection:

- if the new entry is an update to a property that is already scheduled for update then only the later entry need be retained
- if the new entry is an object deletion then all property updates for that object can be removed from the ChangeLog
- if the new entry is an 'undelete' command and the original deletion is still in the ChangeLog then the two entries can both be removed from the ChangeLog 6. Core Algorithms 6.1 Handling Endian-ness Operating systems are fundamentally little endian or big endian which is a choice of the byte order in which numbers and strings are stored. If two computers which have different endian-ness have to communicate then one of the computers will have to switch the endian-ness of its data packets. In the Cognima environment the Cognima client software uses the same endian-ness as the host client device. The Cognima Server has to determine the endian-ness of the client device (it uses a reference value in the first packet of data from the client) and then convert the subsequent incoming data if necessary to maintain consistent endian-ness in the Cognima Server. The Cognima Server also has to convert any outgoing data it sends back to the client device.

6.2 Synchronising System Times

Different devices will inevitably have slightly different system times. Changes that are sent from client devices to the Cognima Server are stamped with the device system time at the time of the change. It is up to the Cognima Server to resolve the times on different devices so that it can judge the order in which changes took place and record the correct update.

The logon of a device contains the current device time. The Cognima Server should be able to compensate for the latency of the network and compare the login time with its own system time. This will give it a delta between the device time and the Cognima Server time. This delta can be applied to further times sent up by the device in that session.

The Cognima Server can compare deltas in successive sessions from a device to determine clock 'creep' on the device or changes of time zone: it cannot be assumed that all the client devices in the system have clocks that are well synchronised to each other:

- Clock times drift on devices depending on the device's clock accuracy.
- Some users like to set clocks 5 minutes early for example.
- Some users will make changes to clocks to account for daylight saving rather than adjusting the locale settings (and some OSes may not provide locale features anyway forcing the user to change the clock directly).

To get round this problem, the server will be responsible for adjusting times used by the client device to GMT when comparisons are made on the Server, and from GMT to the equivalent time for the client device when messages are sent from the Cognima Server to the client device.

The client device will tag all the items in the ChangeLog with times obtained from the local clock—as far as the client device is concerned it only ever deals in time based on the client device's own clock.

Each time the client device connects to the Cognima Server it sends its view of the current time as given by the clock on the client device. From this the Server can work out:

- What the delta to GMT is
- If there has been any drift in the mobile device clock since the last time it logged on since the server keeps a record of the last delta to GMT and when the last connection was made and therefore can compare these. If there is drift the server can adjust all times sent by the mobile device pro-rata.

For example the table below shows a pattern of events with a client device connecting to a Cognima Server. The Client device's time is 5 minutes slower that the Cognima Server and is loosing a minute every hour (an extreme case to show the point). Also to show the point we will assume that from 09:00 to 12:00 the user is on a plane and out of contact with the Cognima Server so it does not connect during this time:

| Action | Client Device Time | Cognima Server time (GMT) |
|---|---|---|
| Client device connects to Cognima Server | 09:00 | 09:05 |
| A change is made to property A | 10:00 | X |
| A change is made to property B | 11:00 | Y |
| Client device connects to Cognima Server | 12:00 | 12:08 |

In order to work out if the property changes were made before or after the time stored on the Cognima Server the times X and Y need to be worked out. From the information above the Cognima Server knows that when the client last connected it was around 3 hours ago and at that point the time difference was 5 minutes whereas now it is 8 minutes. Thus, assuming the clock drift happens linearly, the Cognima Server can work out that the device is 5 minutes behind GMT and that the clock is drifting back a minute every hour.

From this is it possible to work out that the time the client device knows as 10:00 for the property A change needs to have 5 minutes added to it for the initial drift, plus one minute for the extra drift that occurred in the hour till that property was changed.

Likewise Property B needs to be adjusted to 11:07—the 5 minutes initial drift plus 2 minutes since two hours elapsed from 09:00 to 11:00 when the property was changed.

In practice the delta to the time between the client device time and GMT may be minutes, but the drift will be in the order of fractions of seconds per hour.

6.2.1 Time Adjustments

As well as the delta to GMT and any drift in the client device clock, users can also change the time on the client device. They may do this to reset the time to the correct local time (we can give the user the option to have this happen automatically but some users may want to keep their own control of their client device time—e.g. they like to have the clock set 5 minutes fast). They may also make adjustments to reflect a change of local time (i.e. daylight savings or changing timezone). The goal is that the user can change the clock on the device to any time that suits the user and the device simply takes account of this.

When the user makes a change to the client device time most operating systems will report this change (for systems that don't do this the time can be polled say every minute to check for such a change). On detecting a change in time the client device will work out the delta between the new time and the time as it was before the change. For example this may be a change of plus one hour as a user moves timezone. The client device stores this time difference as the Adjust Time which it saves for the next connection to the Cognima Server. The client device also goes through every entry in the ChangeLog and updates all times in the log by Adjust Time. This ensures that the entries in the ChangeLog are always relative to the local time on the client device.

Several such adjustments could be made between connections to the Cognima Server—each time the amount of the time change is summed with the Adjust Time and the ChangeLog updated so that the times in the log are all relative to the local time on the client device.

When the client device next connects to the Cognima Server the client device sends at logon the stored Adjust Time—i.e. the amount by which the client device clock has been adjusted backwards or forwards since the last connection. The Cognima Server can then remove this amount from the time from the delta to GMT and drift calculation.

6.2.2 GMT to Client Device

The same set of calculations can be made in reverse to convert the GMT times of changes made on the Cognima Server to the correct local time for a given client device.

6.3 Adding an Application

An application will use one or more classes to hold user data. The definition of the class is hard coded into the application. The version of the class is co-ordinated by releases of the application.

Say that a statistics application uses a Footballer class to hold data about footballers. When the application starts on a client device for the first time, it inquires from the device what version of the Footballer class the device already holds. If the version on the device is the same as the version that the application has been hard coded to use then nothing more need be done.

If the device holds a newer version of the Footballer class, then the application needs to be robust enough to cope with more properties than it expected. (This situation would arise if you had a class being used by multiple apps and for some reason you installed an older version of one of the apps. This should be rare: ideally interdependent apps should be upgraded together.)

If the device holds an older version of the Footballer class (or no version at all) then the application's version of the Footballer class should replace it. The new version is sent up to the Cognima Server. The Cognima Server therefore maintains a list of versions of classes used on all devices.

The web portal pages will be the equivalent of the hard-coded device application. The web can extract objects from the database according to the latest version of the class, and if there are more properties than it was hard coded to expect it can ignore them. Therefore the web does not need to declare class versions.

6.4 Change-Log Optimisation

The Cognima Server maintains Change-Logs for all devices listing changes that will be sent to the devices when the devices next connect. There will be optimisations that can be made to the Change-Logs, for example:

If >2 updates to the same property are queued in the Change-Log then only the last need be kept.

If a deletion is queued for an object then any updates ahead in the queue may be removed.

If an update is queued for an object then any delete ahead in the queue should be removed.

If a device registers a new application there could potentially be very many objects to send down to it (e.g. message history). The Change-Log should only have a sensible number of objects added to it (e.g. the 20 most recent messages).

7. Ghosting, Resurrection, Pinning and Withdrawal

The space available on a client device to hold user data will typically be orders of magnitude less than the space available on the server. The device needs to hold a subset of data and the user should have to do as little work as possible to maintain this subset. Ghosting and withdrawal are tools to aid this.

A class definition may include flagging certain properties as 'ghostable'. This means that if the object is ghosted those properties will be nulled, freeing room on the client device. Ghosting is done automatically on the device. The decision about which objects to ghost is made by following a 'ghosting rule' and applying the rule whenever an object is created or updated. The rule defines the maximum number of a selection of objects. When the maximum is exceeded the objects in the selection at the bottom of a sort order are ghosted.

For example, the class might be messages, the selection might be messages in the inbox, the sort order might be by date/time and the maximum number might be 50. If there are 50 messages in the inbox and a new message arrives, the oldest message in the inbox is ghosted. Ghosting may remove the message body but leave enough header information for the message to be recognised.

Withdrawal (also known in the past as auto-deletion and removal) is similar to ghosting but works by removing the entire object, not just part of it.

Neither ghosting nor withdrawal are notified to the Cognima Server. They are purely local to the client device. Therefore different devices may have different numbers of objects. The data on the devices is still fundamentally in sync, but the devices hold different data subsets.

If the user wants to resurrect a ghost then a request is passed from the client to the Cognima Server for the object to be resurrected. A refresh of the object is sent down to the device and the object is put back to normal.

Individual objects can be pinned. A pinned object is never ghosted or removed. Pinning can be chosen by the user, or it can happen automatically. For example, an object that is resurrected is automatically pinned.

8. User Replication—Sharing Objects

There are many applications for which we envisage it will be useful for users to be able to share objects. The general way that this will work is: A user needs to know the Cognima address of users that he may want to share objects with. It is more appropriate to discuss the retrieval of these addresses in detail in the Cognima Server architecture. Here we assume that such a list is available.

A set of one or more Cognima addresses is attached to the object which is to be shared. The object can be set to read-only (so the people you share it with cannot modify it). When the Cognima Server receives the new object (or receives an update to it) from the web or a client device it replicates it as normal.

It also looks up the list of 'sharees' Cognima addresses. It marks the object with an originator id (i.e. the Cognima address of the object owner+the object id) and sends it to the sharees. The sharee users may exist on the same Cognima Server or be on different Cognima Servers. The Cognima Server of the sharee receives the object. If it is a new object it assigns a new object id (keeping note of the originator id). If it is an update it finds the object using the originator id. If the sharee is allowed to update the object, the update can be replicated back to the object owner using the originator id.

9. Displaying Data

Conventional small devices like PDA tend to have simple filing systems that allow applications to read and write data to some kind of storage that will keep the data when the application is not running. Generally these programs will tend to read in the available set of data and then provide a user interface to display the data on the screen. This has some disadvantages:

Reading in the data when the program starts takes time

The application needs to store all or some of the data in memory meaning it is now occupying more memory on the client device Allowing more than one application to access the same set of data becomes non-trivial Similar code to read and manipulate the data appears in several applications that run on the device.

The Cognima approach is different:

Data is stored in an Object Database that can be accessed by several applications A Cognima application does not read in all the data it deals with from a database. Instead it creates a selection—a subset of the data which it is currently interested in. In general this selection matches the data that is currently being displayed on the devices screen. Thus only the data currently being used by the application is held in memory—saving a lot of memory space.

All of the work of storing, sorting and indexing the data is done by the Object Database and so this functionality does not need to be repeated in each application.

When changes need to be made to data in an application, the application never directly updates its own display of the data. Changes will update the properties in an object or create or delete an object. A change to the data could be made by another application or an update received from a Cognima Server due to the data being changed on another machine.

When an application sets up a selection it gives a list of criteria by which data is either included or excluded from the selection—because of this the Cognima Replication Engine can tell which applications to notify when a object is created, deleted or updated.

When an update needs to be sent to the application, code in the application linked to the selection that contains this data is called and in this way the application can respond to the changes that have been made.

When selections are set up, the application can also specify how the data is sorted and if only a small window on the sorted list of data is required (known as a view).

This approach is similar to the screen re-paint approach used to redraw graphics screens on Windowing systems. When an area of the screen needs repainting the application that is responsible for that bit of screen is called to repaint the screen.

9.1 Example

A client device may have a contacts application running on it—this device replicates data with a Cognima Server connected to other client devices also running contacts applications. A class of object is defined for a Contact that contains names and phone numbers and these are replicated to all the devices of a given user.

An application on one device may have a display that shows all contacts by beginning letter—for example the interface allows the user to press a D button to show all the names beginning with D. This application will set up a selection that contains objects:

Where the class is defined as Contacts

Where the name begins with the selected letter (e.g. D)

When the selection is defined the application also defines code to be called by the CRE when objects are added, deleted or updated.

When the selection is first set up this code will be called back with the first set of objects that fulfil the above criteria.

If the application was asked to create a new contact with a name beginning with D the application would create the object but do nothing else. The CRE would detect the new object and call back the selection code to notify it of the new object.

Likewise is a new Contact object was created on another device and was replicated to the client device—if the name of that Contact began with D the application would be notified.

9.2 Sorting

Data in selections generally needs to be sorted—often so that when displayed users can see data in a logical format. When a selection is defined the sorting order can be specified: the properties to sort on, in what order and what sorting algorithms to use.

9.3 Views

There may be many items of data in a selection. Commonly when the data is being displayed it may not all fit on the screen and so the user will need to scroll up and down the data. A view provides this functionality by specifying the number of items of data the selection wants to deal with and the number of the first item of data out of the complete list of data the application wants to appear in the selection.

Views are important because they allow an application to limit the amount of data it stores locally to be limited to just the amount needed to display on the screen this reducing unnecessary duplication of data.

9.4 Efficiency

Cognima has made some efficiency optimisations in how the data is transferred between the Cognima server and client application—when multiple data changes are made the data is sent in blocks and then the application informed that the changes are complete so that the application only needs to update its user interface once.

9.5 Example

As an example we will define a selection called Contact-Selection. This is the code that the framework will call back whenever a change is made to any of the selected objects. In the Cognima framework this is implemented as an object which you derive from the COdbSelect templated class—specifying the type of object you want to have in the selection as the template argument.

```
class CContactSelect : public COdbSelect<CContact>
{
public:
    CContactSelect(COdb *aOdb);
    void ObjectAdded(CContact *aObject);
    void ObjectUpdated(CContact *aObject);
    void ObjectRemoved(const TOdbObjectId aObjectId);
private:
    bool ListContacts( );
};
```

The methods ObjectAdded( ), ObjectUpdated( ) and ObjectRemoved( ) are called by the framework whenever respectively an object is added, updated or removed. When you implement the Selection class you don't need to implement all these methods if you do not want to take instance action on any of these events—in some cases you may set up a selection to keep a list of a certain set of objects but only check that list on some other event and so the above methods would not be required.

We have defined one extra private method called ListContacts( )—this will list all the current contacts held by the selection.

Here is the implementation of this class:

```
CContactSelect::CContactSelect(COdb *aOdb)
: COdbSelect<CContact>(aOdb)
{
}
void CContactSelect::ObjectAdded(CTestContact *aContact)
{
```

-continued

```
    OdbLog(OdbLogApp,L"New contact added: " << aContact->
    GetName( ));
    ListContacts( );
}
void CContactSelect::ObjectUpdated(CTestContact *aContact)
{
    OdbLog(OdbLogApp,L"Contact updated: " << aContact->GetName( ));
    ListContacts( );
}
void CContactSelect::ObjectRemoved(const TOdbObjectId aObjectId)
{
    OdbLog(OdbLogApp,L"Contact deleted - Id: " << aObjectId);
    ListContacts( );
}
void CContactSelect::ListContacts( )
{
    OdbLog(OdbLogApp,L"Contacts list:");
    for (unsigned long Index=0; Index<iResult.size( ); Index++)
    {
        CTestContact *Contact=iResult[Index];
        OdbLog(OdbLogApp,Contact->GetName( ) << ","
            << Contact->GetPhone( ) << ","
            << Contact->GetEmail( ));
    }
}
```

The constructor simply calls the default COdbSelect constructor. The ObjectAdded( ), Updated( ) and Removed( ) methods print out what change was made and then call ListContacts( ) to show what the current contents of the list is.

The ListContacts( ) shows how the current list of object held by the selection can be accessed. The current list of pointers to objects is held in a container class called iResult—this can then be accessed by normal container class integrators. In this case we simply go through the list and print all the objects in the list.

The invention claimed is:

1. Method of automatically replicating data objects between a mobile device and a server, connected together via a wireless network, in which the timing of data replication across the network is determined by a network operator applying parameters that make efficient usage of network bandwidth; comprising:
    creating a change log that lists all objects at the device and/or server to be replicated;
    applying, via said network operator, as a first of said parameters, a single weight associated with each object that defines how urgently that object needs to be replicated; and
    applying, via said network operator, as a second of said parameters, a threshold that is a function of time, with the single weight of each object being locally compared to the threshold at a given time and the outcome of the comparison determining whether the object is sent for replication or not at that time;
    wherein all criteria that are relevant to how urgently an object needs to be replicated are represented by the single weight associated with that object.

2. The method of claim 1 in which a connection is established at a given time if the weight of any object exceeds the threshold at that time.

3. The method of claim 1 in which the weight of an object at a given time is a function of one or more of the following:
    (a) Direction of data replication (device to serves or server to device)
    (b) Shelf life, defining the time or duration after which the object will be automatically deleted if still present in the change log
    (c) Whether the object is overwritable (d) Size in bytes
(e) Time entered into the change log
(f) Priority
(g) Time out interval
(h) Assigned time for replication
(i) User assignment of a non-default priority to a given object
(j) Memory available.

4. The method of claim 1 in which the network operator can cause the weight of an object to be altered at any time.

5. The method of claim 1 in which the network operator can cause the threshold to be altered at any time.

6. The method of claim 1 in which the threshold varies over time in such a way that efficient use is made of available bandwidth.

7. The method of claim 1 in which the threshold can vary over time in a different way for different groups of end-users, individual end-users or applications.

8. The method of claim 1 in which dynamic varying of the threshold can occur as cell or network loadings change.

9. The method of claim 1 in which dynamic varying of the threshold can occur to encourage uptake of a new data replication service.

10. The method of claim 1 in which the threshold can vary depending on one or more of the following:
    (a) current time
    (b) device roaming status
    (c) cell or network loading
    (d) time since last replication
    (e) user tariff.

11. The method of claim 1 in which, if the weight of no object exceeds the threshold at a given time, the time interval that will elapse before the weight of any object exceeds the threshold is calculated and a timer set for that time interval.

12. The method of claim 11 in which the time interval is re-calculated if:
    (a) a new object is added to the change log
    (b) a new threshold is deployed
    (c) the timer expires
    (d) cell or network loading alters
    (e) device memory falls below a predefined level
    (f) the device detects that its roaming state changes
    (g) a new application is activated on the device
    (h) a network connection is terminated.

13. The method of claim 1 in which the end-user of the device can override default replication timing in respect of a specific object or type of object.

14. The method of claim 1 in which an object to be replicated is assigned a time limit by which time replication must occur.

15. The method of claim 14 in which the time limit is dynamic.

16. The method of claim 14 in which the time limit alters if memory on the device changes or if the device roams to a new network.

17. The method of claim 1 in which an object to be replicated is assigned a shelf life which defines a time or duration after which the object will be deleted automatically if not replicated.

18. The method of claim 1 in which different parameters enable the network operator to offer end-users different levels of data replication service, each associated with a different tariff.

19. The method of claim 1 in which, once a connection initiating object has been replicated, then further objects in a change log and pending replication are sent as well.

20. The method of claim 19 in which an opportunism threshold function determines the further objects that are sent.

21. The method of claim 20 in which the opportunism threshold changes if the device is on a roaming network.

22. The method of claim 21 in which the opportunism threshold changes depending on whether a cell loading threshold of the cell the device is located in is exceeded.

23. The method of claim 21 in which the opportunism threshold is applied consistently by device and server, with changes to the threshold communicated across the network.

24. The method of claim 21 in, which the network operator can vary the opportunism threshold.

25. The method of claim 1 in which the actual time of replication is a function of the state of the mobile device, the state of the network and the parameters.

26. A mobile device programmed with software that enables the device to replicate data to a server using the method of claim 1.

27. A server programmed with software that enables the server to replicate data to a mobile device using the method of claim 1.

* * * * *

UNITED STATES PATENT AND TRADEMARK OFFICE
CERTIFICATE OF CORRECTION

PATENT NO. : 8,156,075 B2  
APPLICATION NO. : 10/539863  
DATED : April 10, 2012  
INVENTOR(S) : Greenwell et al.

Page 1 of 1

It is certified that error appears in the above-identified patent and that said Letters Patent is hereby corrected as shown below:

On the cover page at item (22), the PCT Filed date should be --Dec. 19, 2003--

Signed and Sealed this
Tenth Day of July, 2012

David J. Kappos
*Director of the United States Patent and Trademark Office*